(12) United States Patent
Bana et al.

(10) Patent No.: US 10,236,118 B1
(45) Date of Patent: Mar. 19, 2019

(54) WIRELESS ENERGY COIL ARRANGEMENT

(71) Applicant: THE UNITED STATES OF AMERICA AS REPRESENTED BY THE SECRETARY OF THE NAVY, Washington, DC (US)

(72) Inventors: Viktor Bana, San Diego, CA (US); John D. Rockway, San Diego, CA (US); Gregory W. Anderson, San Diego, CA (US); Alex Phipps, San Diego, CA (US); Wayne P. Liu, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 273 days.

(21) Appl. No.: 15/246,996

(22) Filed: Aug. 25, 2016

(51) Int. Cl.
| | |
|---|---|
| *H01F 38/00* | (2006.01) |
| *H01F 38/14* | (2006.01) |
| *H02J 50/12* | (2016.01) |
| *H02J 7/02* | (2016.01) |
| *B60L 11/18* | (2006.01) |

(52) U.S. Cl.
CPC ............ *H01F 38/14* (2013.01); *B60L 11/182* (2013.01); *H02J 7/025* (2013.01); *H02J 50/12* (2016.02); *B60L 2200/10* (2013.01); *B60L 2200/32* (2013.01)

(58) Field of Classification Search
USPC .......................................................... 307/104
See application file for complete search history.

(56) References Cited

U.S. PATENT DOCUMENTS

| | | | |
|---|---|---|---|
| 8,796,990 B2 | 8/2014 | Paparo et al. | |
| 9,024,757 B1 | 5/2015 | Oyobe et al. | |
| 9,221,351 B2 | 12/2015 | Miller | |
| 2015/0371771 A1* | 12/2015 | Abu Qahouq | ....... H04B 5/0087 |
| | | | 307/104 |

\* cited by examiner

*Primary Examiner* — Rexford N Barnie
*Assistant Examiner* — Dru Parries
(74) *Attorney, Agent, or Firm* — SPAWAR Systems Center Pacific; Kyle Eppele; Elliott Deaderick

(57) ABSTRACT

A system and method are provided for wirelessly transmitting energy from a transmitter platform to a receiver platform. The system reduces the number of coils on the receiver platform to one, while the remaining coils are located on the transmitter platform. The spacing of the coils on the transmitting platform can be adjusted to optimize the magnetic flux transfer to the single coil on the receiving platform based on the unique distance between the transmitter and receiver platforms.

13 Claims, 4 Drawing Sheets

WIRELESS ENERGY COIL ARRANGEMENT

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 102549.

BACKGROUND

Embodiments of the invention relate to wireless energy transfer through air and other fluid mediums using a plurality of coils.

Induction charging systems use magnetic resonance induction for inductively coupled energy transfer between a transmission platform and a receiving platform. The transmission platform utilizes a primary coil and a secondary coil which are loaded using a capacitor to create a tuned LC circuit. When an alternating current is applied to the primary coil, it will "ring" and form an oscillating magnetic field. The energy will be transferred back and forth between the magnetic field in the coils and the capacitor allowing the magnetic field of the secondary coil to become relatively intense over multiple cycles.

When the primary coil of the receiving platform is placed near the intense magnetic field generated by the coils of the transmission platform, a voltage is induced, creating an electrical current. The change in electrical current of the primary coil then in turn induces a change in voltage in the secondary coil. The induced voltage in the secondary coil creates an electrical current which may then be used for energy by a device attached to the receiving platform.

SUMMARY

An aspect of the present invention is drawn to a system having a first magnetic flux transmitting coil, a second magnetic flux transmitting coil and a third magnetic flux transmitting coil. The first magnetic flux transmitting coil has a first transmitting diameter, $D_T$, and a first number of windings, $N_1$. The second magnetic flux transmitting coil has a second transmitting diameter, $D_{T2}$, and a second number of windings, $N_2$. The third magnetic flux transmitting coil has a third transmitting diameter, $D_{T3}$, and a third number of windings, $N_3$, wherein $D_{T1} < D_{T2}$, and wherein $D_{T2}$ is substantially equal to $D_{T3}$. The second magnetic flux transmitting coil is coaxially disposed at a distance, $L_1$, from the first magnetic flux transmitting coil. The third magnetic flux transmitting coil is coaxially disposed at a distance, $L_2$, from the second magnetic flux transmitting coil, wherein $D_{T1} < D_{T3}$. The first magnetic flux transmitting coil is configured to provide a first amount of magnetic flux to the second magnetic flux transmitting coil. The second magnetic flux transmitting coil is configured to provide a second amount of magnetic flux to the third magnetic flux transmitting coil. The second amount of magnetic flux is based on the first amount of magnetic flux. The third magnetic flux transmitting coil is configured to provide a third amount of magnetic flux based on the second amount of magnetic flux.

The system includes a magnetic flux receiving coil and a device requiring energy. The magnetic flux receiving coil has a diameter, $D_R$, substantially equal to the diameter of the first magnetic flux transmitting coil and has a fourth number of windings, $N_4$. The magnetic flux receiving coil is electrically connected to the device. When the magnetic flux receiving coil is coaxially disposed from the third magnetic flux transmitting coil, the magnetic flux receiving coil is configured to provide electrical energy to the device based on the third amount of magnetic flux provided by the third magnetic flux transmitting coil.

BRIEF DESCRIPTION OF THE DRAWINGS

The accompanying drawings, which are incorporated in and form a part of the specification, illustrate example embodiments and, together with the description, serve to explain the principles of the invention.

DETAILED DESCRIPTION OF SOME EMBODIMENTS

Wireless charging in electric vehicles and platforms in the air, land and undersea environments is typically performed using a plurality of coils that are separated by set distances to facilitate magnetic resonance induction for inductively coupled energy transfer. The coils used in the energy transfer process are generally split with an equal amount of coils on the transmission platform and the receiving platform.

The equal division of coils between the transmission platform and receiving platform can be problematic when used with space and weight sensitive vehicles. Using a single coil on the vehicle not only saves on space and weight, but also minimizes the possibility of magnetic flux leakage onto nearby structures or electrical components which could be harmed or affected by unwanted flux. Using a single coil also enables a degree of flexibility in arranging and locating the coil.

Additionally, magnetic induction is axially dependent, meaning that each coil in the system must be positioned along a straight line to maximize efficiency. This may also be problematic in air and underwater environments where wind gusts and water currents make stabilizing a vehicle difficult. Bundling a single coil with two other coils, such that each coil is perpendicular to each other allows greater flexibility in aligning the transmitter and receiver platforms.

Figure 1:
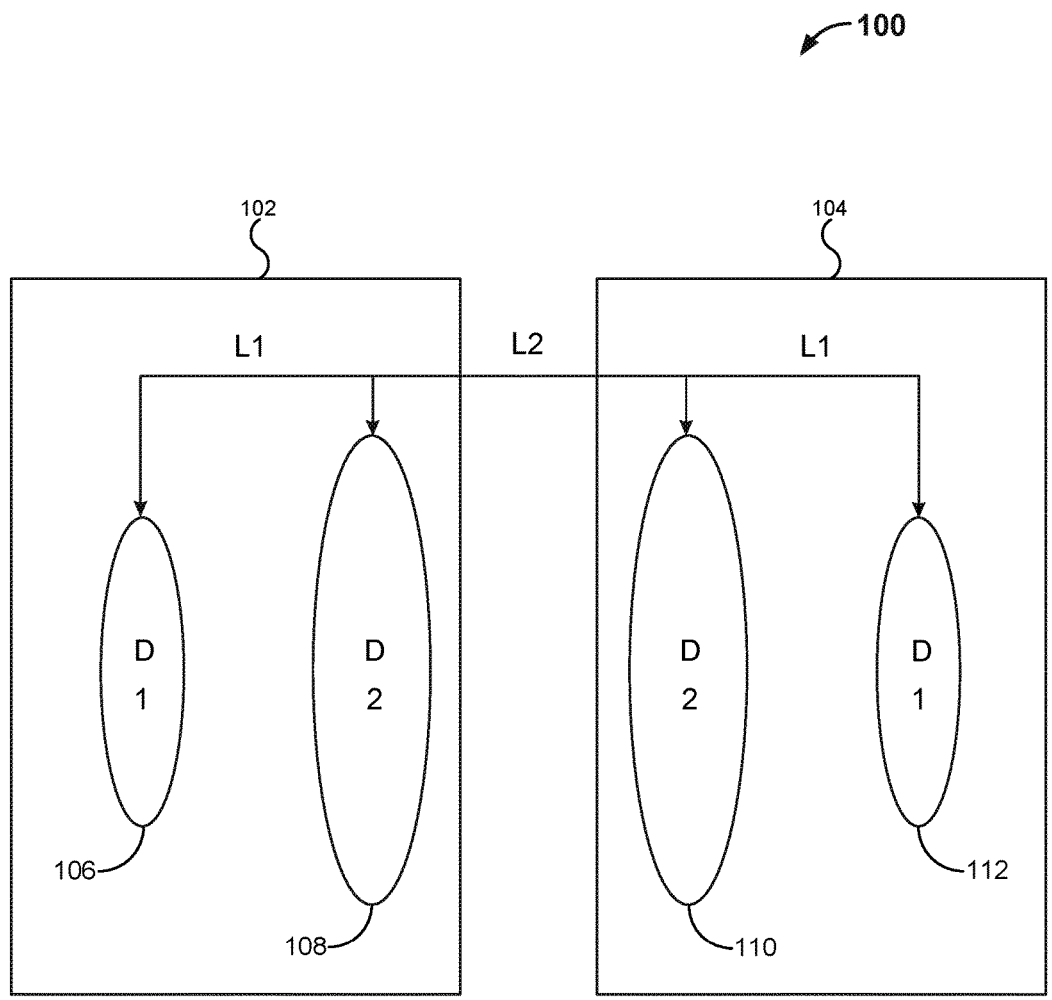
FIG. 1 illustrates a conventional wireless charging system.

A conventional wireless charging system will now be discussed with reference to FIG. 1. FIG. 1 illustrates a conventional wireless energy transfer system 100. As illustrated in the figure, system 100 includes a transmitter platform 102 and a receiver platform 104. Transmitter platform 102 includes a coil 106 and a coil 108. Receiver platform 104 includes a coil 110 and a coil 112. As an example, coil 106 and coil 112 have a diameter $D_1$ ranging between about 4 inches and about 8 inches, and coil 108 and coil 110 have a diameter $D_2$ that is about twice the diameter of coil 106, ranging between about 8 inches and about 16 inches.

Transmitter platform 102 is arranged a distance away from receiver platform 104 such that the distance between coil 108 and coil 110 is distance $L_2$. Coil 106 and coil 108 are arranged on transmitter platform 102 and are separated by a distance $L_1$. Coil 110 and coil 112 are arranged on receiver platform 104 and are separated by a distance $L_1$. As an example for FIG. 1, $L_1$ may range from about 1 cm to about 5 cm and $L_2$ may range from about 10 cm to about 25 cm.

Coil 106, coil 108, coil 110, and coil 112 are configured to work as inductors. An inductor generally includes a conductor, such as wire, wound into a coil. When an AC current is applied to the coil, it creates a time varying magnetic flux. The time varying magnetic flux induces an electromotive force (EMF), which will drive a current towards a lower voltage potential.

If an inductor is connected across a charged capacitor, current will start to flow through the inductor, building up a magnetic field around it and reducing the voltage on the capacitor. Eventually all the charge on the capacitor will be gone and the voltage across it will reach zero. However, the current will continue, because inductors resist changes in current. The current will begin to charge the capacitor with a voltage of opposite polarity to its original charge. The EMF which drives the current is caused by a decrease in the magnetic field, thus the energy required to charge the capacitor is extracted from the magnetic field. When the magnetic field is completely dissipated the current will stop and the charge will again be stored in the capacitor, with the opposite polarity as before. Then the cycle will begin again, with the current flowing in the opposite direction through the inductor.

If an AC current is applied to the inductor, it is possible to drive continuous oscillations. Further if the frequency of the AC current is equal to the natural oscillatory frequency of the inductor, resonance will occur, creating a harmonic oscillator. In this manner, a relatively large magnetic field can be built up over a small number of oscillations.

The large magnetic field will generate an EMF in any nearby conductors, including those of an inductor. If the nearby inductor is also connected to a capacitor, it will begin to charge in the same manner as the first inductor, using the induced EMF as an energy source rather than an applied AC current.

In operation, transmitter platform 102 will be used to wirelessly transmit energy to receiver platform 104. To begin, an AC current with a frequency equal to the oscillation frequency of coil 106 is applied to coil 106. As described above, a large magnetic field is built up in coil 106; this magnetic field induces an EMF in coil 108. Coil 108 uses the induced EMF from the magnetic field in coil 106 to build up a large magnetic field as well.

At this point, receiver platform 104 is brought near transmitter platform 102, such that distance between coil 108 and coil 110 is $L_2$. Once receiver platform 104 is at distance $L_2$ transmitter platform 102, the magnetic field of coil 108 induces an EMF in coil 110. Similar to the operation of coil 106 and coil 108 of transmitter platform 102, coil 110 begins to build a magnetic field using the EMF induced by coil 108. In turn, the built up magnetic field of coil 110 induces an EMF in coil 112.

As an EMF is induced in coil 112, a voltage is created which opposes the change in current created by the EMF. This voltage may act as a positive potential to drive a current to an external energy load. In this manner, energy may be wirelessly transmitted from transmitter platform 102 to receiver platform 104 to provide energy.

The distance in which a coil may induce an EMF on another is proportional to its diameter. In this case, the distance between coil 106 and coil 108 is $L_1$. The distance $L_1$ allows coil 106 to induce an EMF in coil 108 such that the EMF is applied at the oscillation frequency of coil 108. Since both coil 106 and coil 108 are located on transmitter platform 102, the actual distance of $L_1$ is arbitrary since weight and space restrictions do not apply. But, the distance is relatively small due to the diameter of coil 106 being much small than that of coil 108.

The diameter of coil 108 is much larger than that of coil 106, and in turn is able to induce an EMF on another coil, such as coil 110, farther away, which in this example embodiment is distance $L_2$. This allows greater flexibility when positioning receiver platform 104.

In the example embodiment described above, each of transmitter platform 102 and receiver platform 104 use two coils to wirelessly transmit energy. In practical applications, there may be weight and space limitations on the vehicle supporting receiver platform 104. In this case, using multiple coils on a receiver platform is not desirable.

Additionally, since a magnetic field is always created in a direction perpendicular to the direction of current flow, each of coil 106, coil 108, coil 110, and coil 112 must be centered along the same axis to operate efficiently. This is problematic in air and underwater environments where wind gusts and water currents make stabilizing a vehicle difficult.

A system is needed to wirelessly transmit energy to a device without using multiple coils on the receiving platform. Additionally, a system is also needed that is able to wirelessly transmit energy that does not require the transmitter platform and receiver platform to be axially aligned.

Aspects of the present invention provide a system and method of wirelessly transmitting energy using a single coil on a receiving platform, regardless of the alignment of the transmitter and receiving platform.

In accordance with a first aspect of the present invention, a system is provided for wirelessly transmitting energy from a transmitter platform to a receiver platform. The present system reduces the number of coils on the receiver platform to one, while the remaining coils are located on the transmitter platform. The spacing of the coils on the transmitting platform can be adjusted to optimize the magnetic flux transfer to the single coil on the receiving platform, based on the unique distance between the transmitter and receiver platforms.

In accordance with a second aspect of the present invention, a system is provided for wirelessly transmitting energy using a single tri-axial coil arrangement on the receiver platform. Since the transfer of magnetic flux is dependent on axial alignment, using three coils that are perpendicular to each other, allows the magnetic flux to be transferred, independent of the alignment between the transmitter and receiver platform, as any flux that would normally be lost is capture with coils in the orthogonal planes.

The ability to adjust the distance between coils of the transmitter platform and the use of three perpendicular coils on the receiver platform provide a great amount of flexibility in the wireless energy transfer system provided.

Figure 2:
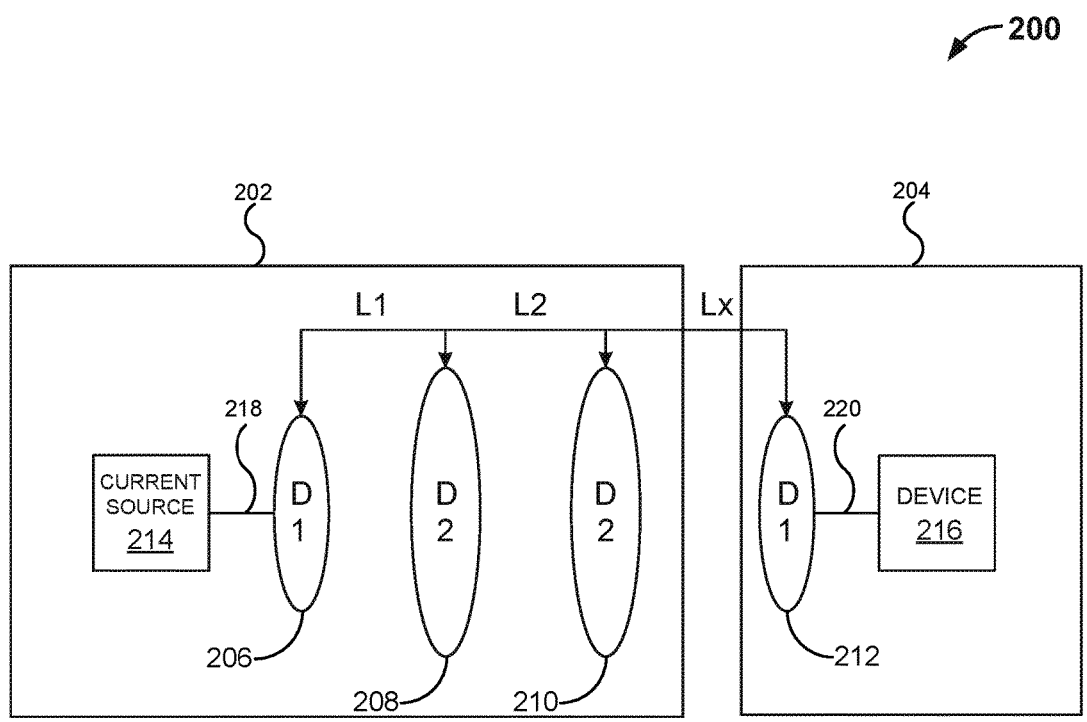
FIG. 2 illustrates a wireless charging system in accordance with aspects of the present invention.

Aspects of the present invention will now be further described with reference to FIGS. 2-4. FIG. 2 illustrates a wireless energy transfer system 200 in accordance with aspects of the present invention. As illustrated in the figure, system 200 includes a transmitter platform 202 and a receiver platform 204. Transmitter platform 202 includes a coil 206, a coil 208, a coil 210 and a current source 214. Receiver platform 204 includes a receiver coil 212 and a device 216.

Transmitter platform 202 is arranged a distance away from receiver platform 204 such that the distance between coil 210 and receiver coil 212 is a distance $L_x$. Coil 206 and coil 208 are arranged on transmitter platform 202 such that they are separated by a distance $L_1$. As an example, $L_1$ may range from about 1 cm to about 5 cm. Coil 208 and coil 210 are arranged on transmitter platform 202 such that they are separated by a distance $L_2$. As an example, $L_1$ may range from about 10 cm to about 25 cm. Current source 214 is arranged to supply a current to coil 206, via line 218. Device 216 is arranged to receive a current from receiver coil 212, via line 220.

Coil 206 is configured to provide a first amount of magnetic flux to coil 208, based on current I, received from current supply 214. As an example, the current I from current supply 214 may be in a range between about 0.25 A to about 2 A. Coil 206 is additionally configured to have a diameter $D_{T1}$ and a number of windings $N_1$. As an example, $D_{T1}$ may be between about 4 in and about 8 in and $N_1$ may be between about 10 turns and 100 turns.

Coil 208 is configured to provide a second amount of magnetic flux to coil 210, based on the first amount of magnetic flux from coil 206. Coil 208 is additionally configured to have a diameter $D_{T2}$ and a number of windings $N_2$. Coil 208 has a diameter $D_{T2}$ such that $D_{T1}<D_{T2}$. As an example, $D_{T2}$ may be about twice the diameter of $D_{T1}$, between about 8 in and about 16 in, and $N_2$ may be between about 10 turns and 100 turns.

Coil 210 is configured to provide a third amount of magnetic flux to receiver coil 212, based on the second amount of magnetic flux from coil 208. Coil 210 is additionally configured to have a diameter $D_{T3}$ and a number of windings $N_3$. Coil 210 has a diameter such that $D_{T2}$ is associated with $D_{T3}$. The efficiency of magnetic coupling between coil 208 and coil 210 is maximized when $D_{T2}$ is substantially equal to $D_{T3}$. As an example, $D_{T3}$ may be between about 8 in and about 16 in and $N_3$ may be between about 10 turns and 100 turns.

Receiver coil 212 is configured to provide electrical energy to device 216, based on the third amount of magnetic flux provided by coil 210. Receiver coil 212 is additionally configured to have a diameter $D_R$ and a number of windings $N_4$. The efficiency of magnetic coupling between coil 210 and coil 212 is maximized when $D_{T1}$ is substantially equal to $D_R$ and when $L_1$ is substantially equal to $L_x$. As an example, $D_R$ may be in a range across the values of the other coils, such as between about 4 in and about 16 in, $N_4$ may be between about 10 turns and 100 turns.

For the system shown in FIG. 2, $L_1$ may range in value from about 1 cm to about 5 cm, $L_2$ may range in value from about 1 cm to about 10 cm, $L_x$ may range in value from about 1 cm to about 25 cm.

It should be recognized by a person having ordinary skill in the art that although the above coil diameters were given in the inches scale and the distances between coils were given in the centimeter scale, the dimensions can be scaled upward (e.g. feet, meters) or downward (e.g. millimeters) depending upon the particular application involved and the number of windings on the coils. Further, although examples of the number of windings $N_1$ to $N_4$ have been provided above, the number of windings in coils 206, 208, 210 and 212 may be chosen to step up/down the induced current as known to those of skill in the art, depending upon the diameters of the coils, the distance between the coils, and the current value.

In operation, energy will need to be wirelessly transmitted from current supply 214 to device 216. In this example embodiment, coil 206, coil 208, and coil 210 are disposed on the same axis as coil 212.

To start, current source 214 provides an AC current I to coil 206, via line 218. The frequency of current I, is equal to the natural oscillatory frequency of coil 206. As current I is supplied, a large magnetic field begins to build up in coil 206; this magnetic field induces an EMF in coil 208, which in turn creates the buildup of a large magnetic field. Similarly, as a large magnetic field builds in coil 208, an EMF is induced in coil 210, creating a magnetic field.

Since the efficiency of energy transfer between two coils is dependent on a resonance between the two coils, efficiency is maximized when resonance is achieved between each of coil 206, coil 208, coil 210, and receiver coil 212. The distance $L_x$ between coil 210 and receiver coil 212 may be different depending on the usage scenario. As such, the distance between each of coil 206, coil 208, and coil 210 may be adjusted to optimize the magnetic flux transfer to receiver coil 212.

In this example embodiment, the optimum distance between coil 206 and coil 208 is distance $L_1$, and the optimum distance between coil 208 and coil 210 is distance $L_2$.

At this point, receiver platform 204 is brought next to transmitter platform 202 such that the distance between coil 210 and receiver coil 212 is $L_x$. Once receiver coil 212 is a distance $L_x$ away from coil 210, the magnetic field in coil 210 induces an EMF in coil 212.

As an EMF is induced in coil 212, a voltage is created which opposes the change in current created by the EMF. This voltage acts a positive potential to drive a current from coil 212 to device 216, via line 220, which may then use the current to operate.

There may be instances where transfer platform 202 does not align with receiver platform 204 wherein coil 210 is not coaxially located with respect to coil 212. In some embodiments, coil 206, coil 208, coil 210 and coil 212 may be axially rotated so as to optimize a coaxial alignment. In other embodiments, coil 212 may be replaced with a tri-axial coil to optimize a coaxial alignment with coil 210. This will be discussed with additional reference to FIG. 3.

Figure 3:
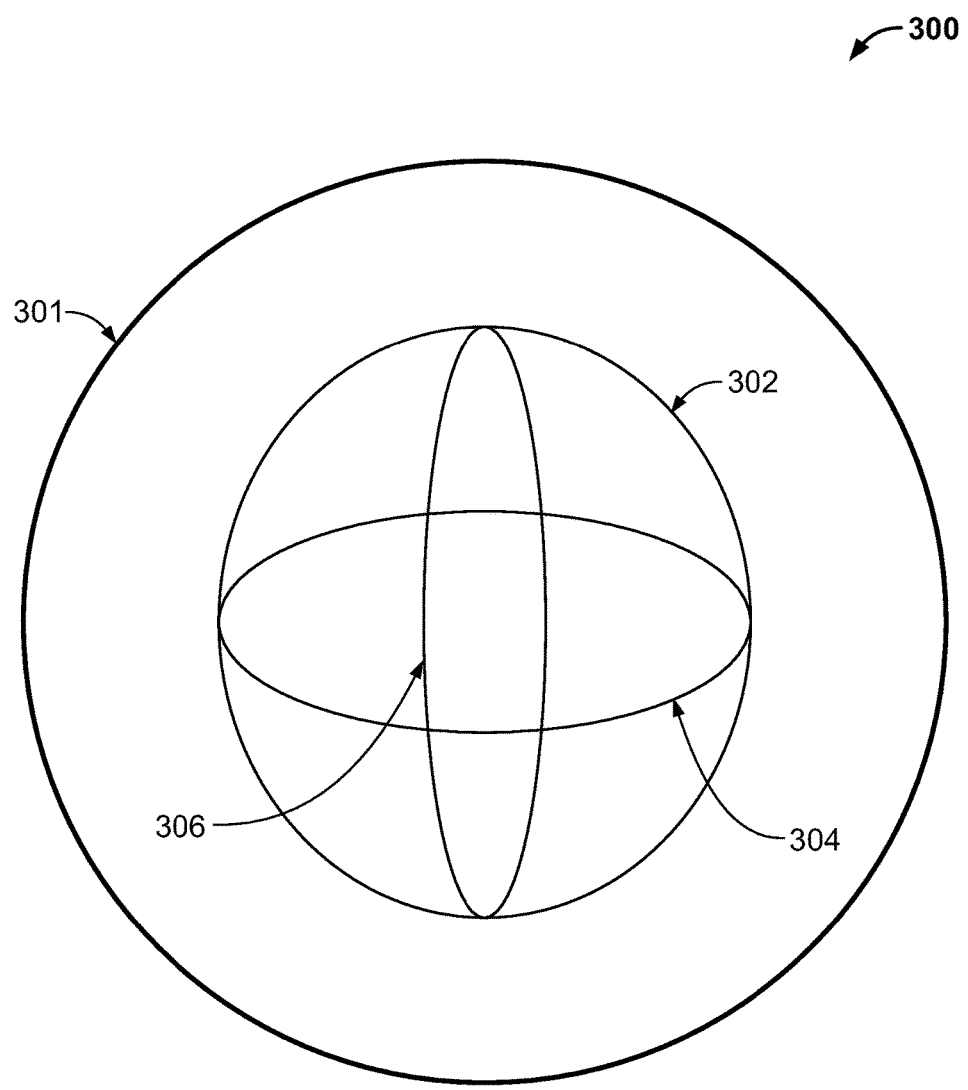
FIG. 3 illustrates a tri-axial receiver coil in accordance with aspects of the present invention.

FIG. 3 illustrates a block diagram 300 of an example embodiment of a tri-axial receiver coil 301. As illustrated in the figure, receiver coil 301 includes a coil 302, a coil 304, and a coil 306. Coil 302, coil 304, and coil 306 are arranged tri-axially so that the coils are in orthogonal planes. Coil 302, coil 304, and coil 306 are configured to receive an amount of magnetic flux from coil 210 of FIG. 2.

Coil 302, coil 304, and coil 306 are arranged such that their planes are orthogonal to each other. Since a magnetic field is always created in a direction perpendicular to the direction of current flow, any axial misalignment will result in a lower efficiency of the energy transfer process. But if the respective planes containing coils 302, 304, and 306, and loss of flux due to "misalignment" of coils 302 is mitigated (i.e., the lost flux is captures by coils 304 and 306.1

Suppose that a magnetic flux is transmitted in a direction such that 50% of the flux is transmitted along the axis of coil 302, 25% is along the axis of coil 304, and the remaining 25% is transmitted along the axis of coil 306. Also suppose that the axis of coil 302 is the axis of the transmitter that transmitted the magnetic flux. In a conventional wireless energy transfer system using one receiving coil, only 50% of the magnetic flux would be received by coil 302.

In this example embodiment, even though the magnetic flux is transmitted in a direction that is axially misaligned to the axis of coil 302, the total flux can be received by having coil 304 and coil 306 disposed on axes that are perpendicular to that of the axis of coil 302.

Referring back to FIG. 2, in operation, energy will need to be wirelessly transmitted from current supply 214 to device 216. In this example embodiment, coil 206, coil 208, and coil 210 are disposed on the same axis as coil 302 of FIG. 3. To start, current source 214 provides an AC current I to coil 206, via line 218. The frequency of current I, is equal to the natural oscillatory frequency of coil 206. As current I is supplied, a large magnetic field begins to build up in coil 206; this magnetic field induces an EMF in coil 208, which in turn creates the buildup of a large magnetic field. Similarly, as a large magnetic field builds in coil 208, an EMF is induced in coil 210, creating a magnetic field.

Since the efficiency of energy transfer between two coils is dependent on a resonance between the two coils, it is imperative that resonance be achieved between each of coil 206, coil 208, coil 210, and receiver coil 301. Since the distance $L_x$ between coil 210 and receiver coil 301 may be different depending on the usage scenario, the distance between each of coil 206, coil 208, and coil 210 may be adjusted to optimize the magnetic flux transfer to receiver coil 301. In this example embodiment, the optimum distance between coil 206 and coil 208 is distance $L_1$, and the optimum distance between coil 208 and coil 210 is distance $L_2$.

At this point, receiver platform 204 is brought next to transmitter platform 202 such that the distance between coil 210 and receiver coil 301 is $L_x$. Referring to FIG. 3, once receiver coil 301 is a distance $L_x$ away from coil 210, the magnetic field in coil 210 induces an EMF in coil 302. Since each of coil 206, coil 208, coil 210, and coil 302 are along the same axis, there is no EMF induced in coil 304 or coil 306 by the transmission of off axis magnetic flux.

As an EMF is induced in coil 302, a voltage is created which opposes the change in current created by the EMF. This voltage acts a positive potential to drive a current from coil 302 to device 216, via line 220, which may then use the current to operate.

Figure 4:
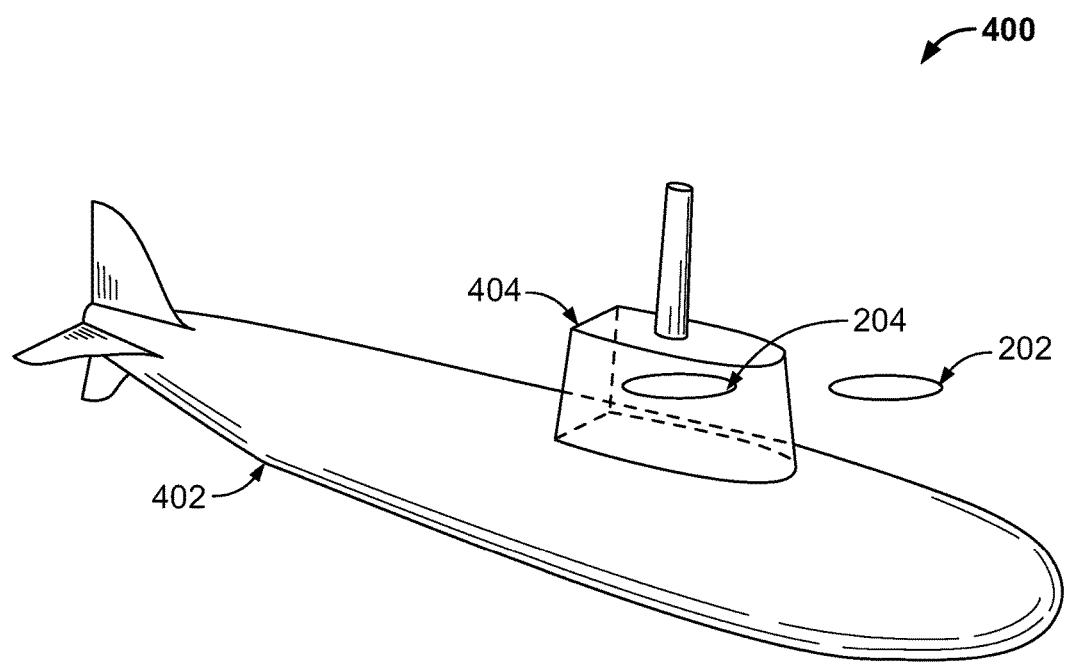
FIG. 4 illustrates the operation of a wireless charging system in a vehicle in accordance with aspects of the present invention.

FIG. 4 illustrates a block diagram 400 of wireless energy transfer system 200 used in an unmanned vehicle. As illustrated in the figure, block diagram 400 includes all of the elements of FIG. 2 with the exception that receiver platform 204 is located in fin 404 of vehicle 402. Vehicle 402 requires energy to operate. In this example embodiment, vehicle 402 is an underwater vehicle. In other embodiments, vehicle 402 may be a ground vehicle or aerial vehicle. Fin 404 houses receiver platform 204.

In operation, vehicle 402 is an underwater vehicle that needs to occasionally receive energy from transmitter platform 202. In this example embodiment, suppose that transmitter platform 202 and receiver platform 204 are axially misaligned and coil 210 transmits magnetic flux in a direction such that 50% of the flux is transmitted along the axis of coil 302, 25% is along the axis of coil 304, and the remaining 25% is transmitted along the axis of coil 306.

The process begins with current source 214 providing a current I to coil 206. Coil 206 will induce an EMF in coil 210, via coil 208, which will build up a magnetic field. At this point, since vehicle 204 moves to a position such that receiver coil 301 located in fin 404 is a distance $L_x$ away from coil 210.

At this point, since vehicle 404 is underwater, currents and motion in the water continually exert forces on vehicle 404 in randomized directions. As such, vehicle 404 cannot stay in a position such that coil 206, coil 208, coil 210, and receiver coil 301 are axially aligned.

Referring to FIG. 3, since the coils of transmitter platform 202 and receiver platform 204 are not aligned, the magnetic flux transmitted by coil 210 is transmitted in a direction such that 50% of the flux is transmitted along the axis of coil 302, 25% is along the axis of coil 304, and the remaining 25% is transmitted along the axis of coil 306.

The magnetic flux transmitted by coil 210 induces an EMF in coil 302, which creates a voltage potential. The voltage potential drives a current from coil 302 to device 216, which then delivers the current to vehicle 404. Since only 50% of the magnetic flux was received by coil 302, the current driven towards device 216 is half of what it would be if each of the coils in transmitter platform 202 and receiver platform 204 were axially aligned. But, the magnetic flux transmitted by coil 210 additionally induces an EMF in coil 304 and coil 306.

Coil 304 and coil 306 each use the voltage potential created by the induced EMF to drive a current to device 216. Similar to coil 302, since only 25% of the total magnetic flux transmitted by coil 210 was received, only 25% of the current is driven to device 216, by each of coil 304 and coil 306.

In this manner, even though the magnetic flux transmitted was axially misaligned to receiver platform 204, each of coil 302, coil 304, and coil 306 were able to receive the portion of magnetic flux transmitted along their respective axes, allowing receiver coil 301 to receive the total magnetic flux transmitted by transmitter platform 202.

In the non-limiting example embodiment discussed above with reference to FIG. 4, receiver platform 204 is disposed within vehicle 402. In other embodiments, receiver platform 204 may be disposed outside vehicle 402, for example connected to a towed electrically conductive cable that is able to conduct received energy from receiver platform 204 to vehicle 402.

In summary, a problem the convention system and method for wirelessly transferring energy is that an equal number of coils are used on the transmitter and receiver platforms. The use of multiple coils on the transmitter platform is problematic on space and weight sensitive vehicles. Another problem with the convention system and method for wirelessly transferring energy is that axial alignment is required between the coils of the transmitter platform and the receiver platform. Achieving axial alignment is difficult for undersea and aerial vehicles that are subject to environmental turbulence.

The disclosed embodiments provide a system and method for wirelessly transferring energy using a single coil on a receiver platform to reduce weight and space used. The remaining coils located on the transmitter platform can be adjusted to optimize the magnetic flux transfer to the single coil on the receiving platform.

The disclosed embodiments also provide a system and method for wirelessly transferring energy using a tri-axial arrangement of coils on the receiver platform. If magnetic flux is transmitted in a direction that is not along the axis of a single coil, the remaining coils will be able to receive the portion of magnetic flux transmitted along their own respective axis. This allows energy to be transferred between the transmitter platform and receiver platform independent of their alignment.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A system comprising:
a transmitter platform comprising:
a first magnetic flux transmitting coil having a first transmitting diameter, $D_{T1}$, and a first number of windings, $N_1$;
a second magnetic flux transmitting coil having a second transmitting diameter, $D_{T2}$, and a second number of windings, $N_2$;
a third magnetic flux transmitting coil having a third transmitting diameter, $D_{T3}$, and a third number of windings, $N_3$, where $D_{T1}<D_{T2}$, $D_{T2}$ is substantially equal to $D_{T3}$, the second magnetic flux transmitting coil is coaxially disposed at a distance, $L_1$, from the first magnetic flux transmitting coil, the third magnetic flux transmitting coil is coaxially disposed at a distance, $L_2$, from the second magnetic flux transmitting coil, $D_{T1}<D_{T3}$, the first magnetic flux transmitting coil is configured to provide a first amount of magnetic flux to the second magnetic flux transmitting coil, the second magnetic flux transmitting coil is configured to provide a second amount of magnetic flux to the third magnetic flux transmitting coil, the second amount of magnetic flux is based upon the first amount of magnetic flux, the third magnetic flux transmitting coil is configured to provide a third amount of magnetic flux based on the second amount of magnetic flux; and
a receiver platform comprising:
a magnetic flux receiving coil having a diameter, $D_R$, substantially equal to the diameter of the first magnetic flux transmitting coil and having a fourth number of windings, $N_4$; and
a device requiring energy, wherein the magnetic flux receiving coil is electrically connected to the device, wherein when the magnetic flux receiving coil is coaxially disposed from the third magnetic flux transmitting coil, the magnetic flux receiving coil is configured to provide electrical energy to the device based on the third amount of magnetic flux provided by the third magnetic flux transmitting coil.

2. The system of claim 1, wherein the first magnetic flux transmitting coil is disposed from the second magnetic flux transmitting coil at a distance $L_1$, the second magnetic flux transmitting coil is disposed from the third magnetic flux transmitting coil at a distance $L_2$, the third magnetic flux transmitting coil is disposed from the magnetic flux receiving coil at a distance $L_X$, and $L_1$ is substantially equal to $L_X$.

3. The system of claim 1, wherein distances between the first, second, and third magnetic flux transmitting coils are adjustable to optimize magnetic flux transfer to the magnetic flux receiving coil.

4. The system of claim 1, wherein the magnetic flux receiving coil comprises a tri-axial arrangement of a first magnetic flux receiving coil, a second magnetic flux receiving coil and a third magnetic flux receiving coil.

5. The system of claim 4, wherein when the magnetic flux receiving coil is not coaxially disposed from the third magnetic flux transmitting coil, loss of magnetic flux is mitigated by the tri-axial arrangement of the first, second, and third magnetic flux receiving coils.

6. A system comprising:
a receiver platform comprising:
a magnetic flux receiving coil having a diameter, $D_R$; and
a device requiring energy, wherein the magnetic flux receiving coil is electrically connected to the device requiring energy and is configured to receive magnetic flux therefrom; and
a transmitter platform comprising:
a current source configured to provide a current, I;
a first magnetic flux transmitting coil arranged to receive I and having a diameter, $D_{T1}$, substantially equal to $D_R$ and having a first number of windings, $N_1$;
a second magnetic flux transmitting coil coaxially disposed at a distance, $L_1$, from the first magnetic flux transmitting coil, the second magnetic flux transmitting coil having a second transmitting diameter, $D_{T2}$, and a second number of windings, $N_2$; and
a third magnetic flux transmitting coil coaxially disposed at a distance, $L_2$, from the second magnetic flux transmitting coil, the third magnetic flux transmitting coil having a third transmitting diameter, $D_{T3}$, and a third number of windings, $N_3$,
wherein $D_{T1}<D_{T2}$,
wherein $D_{T2}$ is substantially equal to $D_{T3}$,
wherein the first magnetic flux transmitting coil is configured to provide a first amount of magnetic flux, based on I, to the second magnetic flux transmitting coil,
wherein the second magnetic flux transmitting coil is configured to provide a second amount of magnetic flux to the third magnetic flux transmitting coil, the second amount of magnetic flux being based on the first amount of magnetic flux, and
wherein the third magnetic flux transmitting coil is configured to provide a third amount of magnetic flux, based on the second amount of magnetic flux, to the magnetic flux receiving coil.

7. A method comprising the steps of:
providing, via a current source, a current I;
generating a first magnetic flux via a first magnetic flux transmitting coil arranged to receive I and having a diameter, $D_{T1}$, and having a first number of windings, $N_1$;
generating a second magnetic flux, based on the first magnetic flux, via a second magnetic flux transmitting coil coaxially disposed at a distance, $L_1$, from the first magnetic flux transmitting coil, the second magnetic flux transmitting coil having a second transmitting diameter, $D_{T2}$, and a second number of windings, $N_2$;
generating a third magnetic flux, based on the second magnetic flux, via a third magnetic flux transmitting coil coaxially disposed at a distance, $L_2$, from the second magnetic flux transmitting coil, the third magnetic flux transmitting coil having a third transmitting diameter, $D_{T3}$, and a third number of windings, $N_3$;
coaxially disposing a magnetic flux receiving coil from the third magnetic flux transmitting coil, the magnetic flux receiving coil having a diameter, $D_R$, substantially equal to the diameter of the first magnetic flux transmitting coil and having a fourth number of windings, $N_4$; and
generating a received current, $I_R$, via the magnetic flux receiving coil, based on the third magnetic flux,
wherein $D_{T1}<D_{T2}$,
wherein $D_{T2}$ is substantially equal to $D_{T3}$, and wherein the current source, the first magnetic flux transmitting coil, the second magnetic flux transmitting coil, and the third magnetic flux transmitting coil are included in a transmitter platform.

8. The method of claim 7, further comprising the step of providing $I_R$ to a device requiring energy.

9. The method of claim 7, wherein distances between the first, second, and third magnetic flux transmitting coils are adjustable to optimize magnetic flux transfer to the magnetic flux receiving coil.

10. The method of claim 7, wherein the magnetic flux receiving coil and the device requiring energy are included in a receiver platform.

11. The method of claim 7, wherein the step of coaxially disposing a magnetic flux receiving coil from the third magnetic flux transmitting coil comprises coaxially disposing a tri-axial arrangement of a first magnetic flux receiving coil, a second magnetic flux receiving coil and a third magnetic flux receiving coil.

12. The method of claim 11, wherein when the magnetic flux receiving coil is not coaxially disposed from the third magnetic flux transmitting coil, loss of magnetic flux is mitigated by the tri-axial arrangement of the first, second, and third magnetic flux receiving coils.

13. The method of claim 7, wherein the third magnetic flux transmitting coil is disposed from the magnetic flux receiving coil at a distance $L_X$, and $L_1$ is substantially equal to $L_X$.

* * * * *